DIFFUSION TRANSFER PROCESS UTILIZING HEAT TRANSFER

Filed July 25, 1963

INVENTOR.
Edwin H. Land
BY
Brown and Mikulka
and
Stanley H. Mervis
ATTORNEYS

DIFFUSION TRANSFER PROCESS UTILIZING HEAT TRANSFER

INVENTOR
Edwin H. Land
BY Brown and Mikulka
and
Stanley H. Mervis
ATTORNEYS

United States Patent Office 3,427,159
Patented Feb. 11, 1969

1

3,427,159

DIFFUSION TRANSFER PROCESS UTILIZING HEAT TRANSFER

Edwin H. Land, Cambridge, Mass., assignor to Polaroid Corporation, Cambridge, Mass., a corporation of Delaware Filed July 25, 1963, Ser. No. 297,559
U.S. Cl. 96—29 6 Claims
Int. Cl. G03c *5/54;* G03d *9/00*

ABSTRACT OF THE DISCLOSURE

Processing of a diffusion transfer film unit is initiated outside of the camera at relatively low tempeartures, e.g., below about 60° F., with the film unit being placed within a heat conductive film holder promptly after removal from the camera. The heat conductive film holder may be constructed of thin aluminum sheets and preferably is prewarmed prior to insertion therein of the film unit.

This invention relates to photography and, more particularly, to a photographic accessory useful in processing photographic film units and to methods of employing said accessory.

In general, the photographic film units with which this invention is concerned are adapted for incorporation in a photographic film pack or structure of the type shown, for example, in U.S. Patents Nos. 3,002,437 and 3,080,805, and useful in cameras of the types shown in said patents. Such film packs generally comprise a container having at least one film unit mounted for exposure within said container, and a closure element for preventing the admission of light into said container. As disclosed in said patents, each film unit includes, in combination, a first photosensitive element positioned for photoexposure within the container; a second non-photosensitive element, preferably a print-receiving element, adapted to be superposed with said photosensitive element during withdrawal of the film unit from the container, said withdrawal being effected following photoexposure thereof; and frangible container means adapted to releasably retain a fluid processing composition for distribution between said photosensitive and print-receiving elements as said elements are brought into superposition subsequent to photoexposure. The exposed film unit, i.e., the lamination obtained by distributing said fluid processing composition between the exposed photosensitive element and the print-receiving element, is removed from the camera, and processing completed in the light.

It will be apparent that processing of film units of the type described above represents a radical departure from the now well-known self-developing cameras wherein processing is effected within a second dark chamber within the camera. The differences in processing go beyond the obvious problems of light shielding the developing photosensitive layer or layers, and become particularly marked when it is desired to employ such a film unit at relatively low temperatures.

This invention is concerned with the processing of such film units at relatively low temperatures, and with providing an accessory for facilitating such low temperature processing.

The principal objects of the present invention therefore are to provide novel holders for receiving an exposed film unit after withdrawal thereof from a camera, and to provide methods of employing said film holders in the processing of said film units.

A further object of the present invention is to provide novel and simple means for transferring heat to a photosensitive material during at least a major portion of the processing of said photosensitive material.

2

Another object of this invention is to provide means for holding photosensitive materials during processing thereof whereby said photosensitive materials may be employed at low temperatures and the processing times at said temperatures may be reduced.

Another object of this invention is to provide methods and means whereby photographic film units may be exposed at relatively low temperatures, processing being initiated at said relatively low temperatures and completed at relatively higher temperatures.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
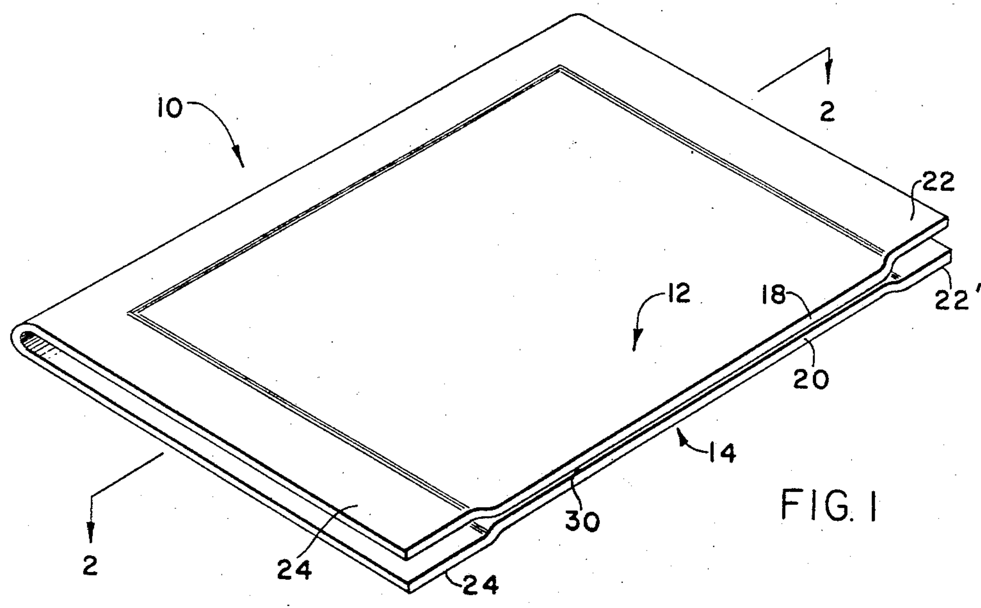
FIGURE 1 is a top perspective view of one embodiment of a film holder comprising the present invention.

Photographic films adapted for performing diffusion transfer processes are well known and have been commercially available since 1948. The initially introduced films produced a black-and-white silver transfer image in one minute at room temperature; this imbibition time was subsequently reduced to as short as 10 seconds. The first commercially available diffusion transfer color film was introduced in early 1963 with a recommended imbibition time of 50 seconds at room temperature. Where the color film was to be processed at relatively low temperatures, for example, below 60° F., the recommended imbibition time was increased to 90 seconds. At imbibition temperatures below about 45° F., still longer imbibition times were recommended, with the warning that picture quality might suffer at such low temperatures. In addition, the user was advised to effect exposure using appreciably low exposure indices, if the processing was to be effected at such low temperatures.

Where the film is processed in a roll film camera of the type shown in U.S. Patent No. 2,455,111, issued Nov. 30, 1948 to Joseph F. Carbone et al., the processing is effected in a dark chamber within the camera. The temperature within this dark chamber may well be above the actual air temperature, e.g., by virtue of the camera having been left in the sun or near another source of heat, so that the aforementioned problem of low temperature processing inherently was at least partially offset by the structure of the camera. In addition, it is possible to so construct such a camera as to position a source of heat adjacent said dark chamber, as disclosed in U.S. Patent No. 2,768,564 issued Oct. 30, 1956, to Edwin H. Land.

Since the film units with which this invention is concerned are processed outside of the camera, the actual processing temperature becomes essentially the ambient temperature, i.e., the air temperature whether indoors or outdoors. This fact greatly increases the problems present in low temperature processing, particularly where the normal or room temperature imbibition time is a relatively long one, i.e., on the order of 50 to 60 seconds.

It has now been found that such diffusion transfer film units may be exposed at relatively low temperatures, the processing composition applied and processing initiated at said relatively low temperature without adverse effects provided the partially processed film unit is promptly placed within a heat conductive film holder. The film holder is composed of a relatively rigid heat conductive material so designed as to permit ready insertion and removal of the film unit, and suitably dimensioned so as to cover at least the image portions of the film unit. After photoexposure of the film unit, the film unit is withdrawn from the camera and promptly placed within the film holder which is promptly placed within a relatively warm area where heat may be provided by conduction, e.g., the holder may be placed within the wearing apparel of the user. Body heat is transferred to the film holder and from the film holder to the air within the portion of the film holder which receives the film unit. This method of processing is most effective where the film holder has been prewarmed, e.g., by having been kept in said warmer area for a period of time prior to insertion of said film unit. In the preferred embodiments, the temperature within the film holder is at least 65° F., and preferably is about 75° F. The use of the film holder and the method of processing comprehended in this invention is particularly effective where the air temperature is below 60° F., and especially where the air temperature is 45° F. or lower.

Figure 2:
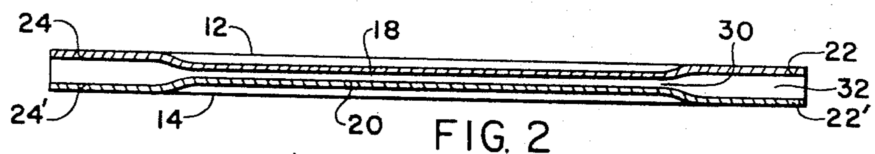
FIG. 2 is a cross-section of the film holder shown in FIGURE 1 taken on the line 2—2.
Figure 3:
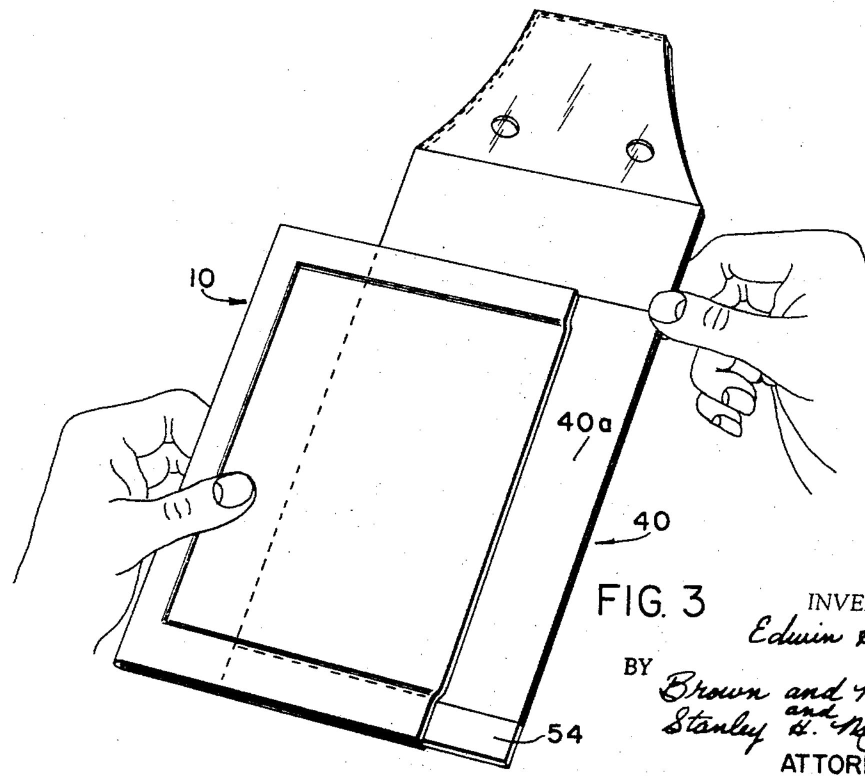
FIG. 3 is a perspective view showing a film unit being inserted into the film holder of FIGURE 1.

The film holders of this invention generally comprise two sections attached along at least one edge and may be movable with respect to each other or suitably spaced from each other so as to receive a film unit therebetween whereby said film unit is held in heat transfer relationship to each of said sections. These sections may be formed of a single piece of sheet material, said sheet material being folded to provide said sections (as shown in FIGS. 1, 2 and 3). In the preferred embodiments, the two sections are pivotally attached by any appropriate hinge means, such as a flexible strip (as in FIGS. 4 and 5) of plastic or cloth, a simple hinge, or a spring-loaded hinge. The film holder may be formed of any suitable sheet material adapted to readily and quickly transfer heat. A particularly useful and preferred sheet material is aluminum. The outer surfaces of the sheet material may be treated in any desired way for design appeal, e.g., embossed. The sheet materials preferably are relatively rigid so that they may be placed in a pocket without danger of undesired compression, wrinkling or other physical damage to the film unit.

As shown in FIGS. 1, 2 and 3, a film holder 10 comprises a first section 12 and a second section 14, each of said sections being generally rectangular and conforming to or larger than the photosensitive area, i.e., image area 40*a*, of the film unit to be employed therewith, said sections 12 and 14 being joined by a fold 16. A centrally-disposed portion 18 of first section 12, conforming to or larger than the photosensitive area of said film unit, is depressed inwardly, as is a corresponding centrally-disposed portion 20 of second section 14. The inwardly-depressed portions 18 and 20 are spaced apart a distance 30 adapted to provide rapid and efficient heat transfer from said portions 18 and 20 to a film unit 40 positioned therebetween (FIG. 3). Flange portions 22 and 24 of the first section 12, together with corresponding flange portions 22' and 24' of the opposing second section 14 are spaced apart a greater distance 32 than said centrally-disposed portions 18 and 20, thereby facilitating ingress and egress of the film unit. The greater thickness of the space 32 defined by the opposing flanges 22 and 22' also compensates for the greater thickness of portions of the film unit usually found adjacent the image portion thereof, e.g., by virtue of splices, the position of the processing composition container, etc.

Figure 4:
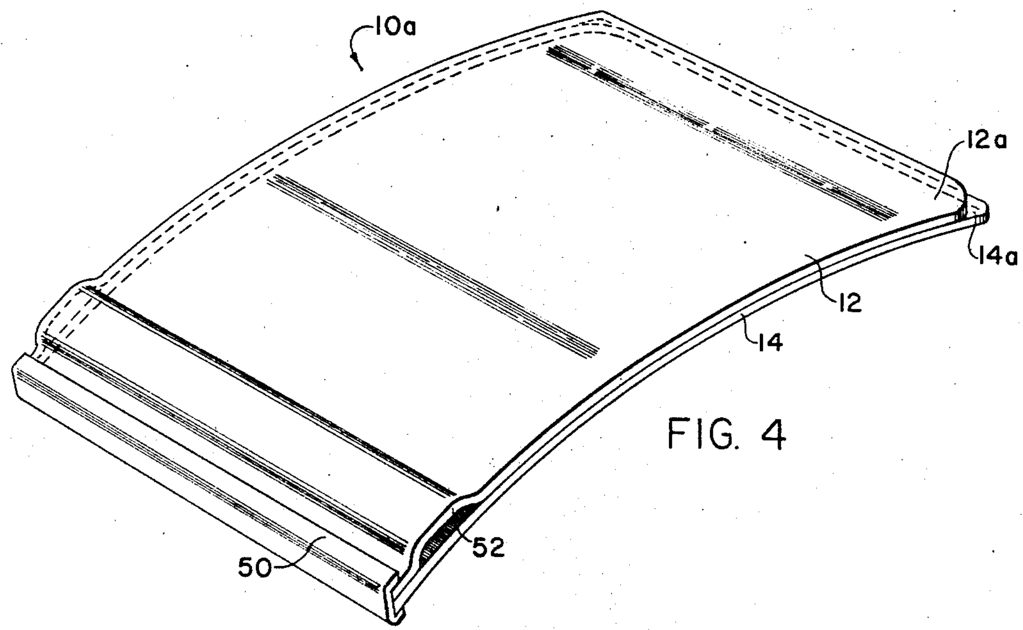
FIG. 4 is a top perspective view of another embodiment of a film holder of the present invention.
Figure 5:
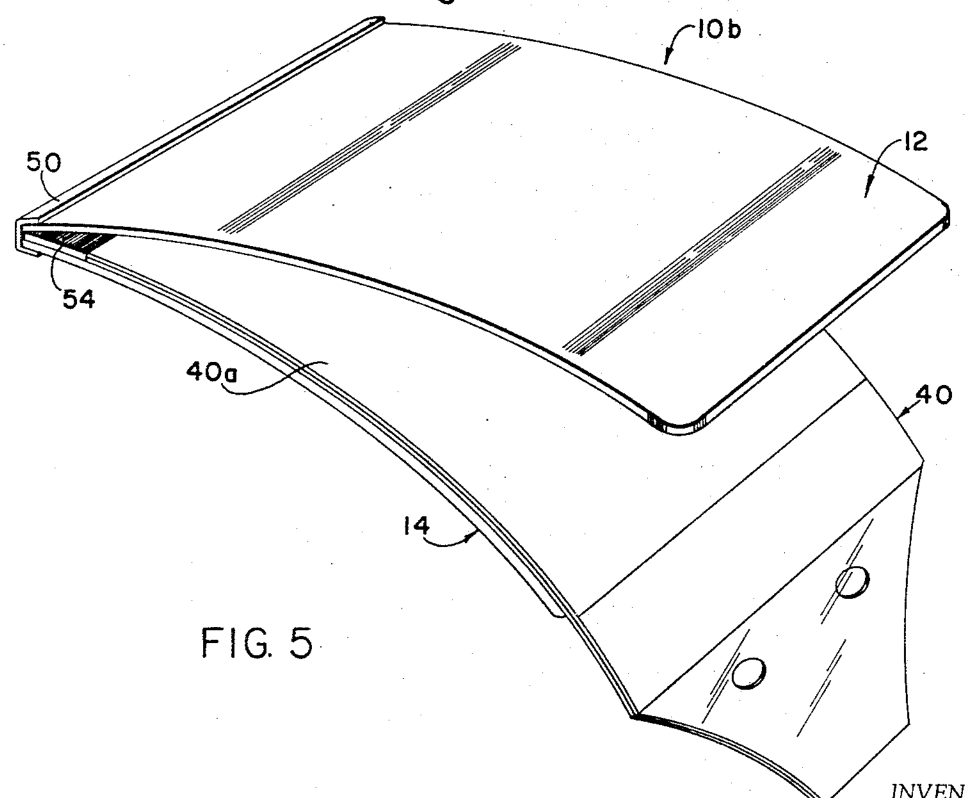
FIG. 5 is a perspective view of still another embodiment of a film holder in accordance with this invention, said film holder being partially open and having a film unit positioned therein.

Turning to FIGS. 4 and 5, there are shown two additional embodiments of film holders. As shown therein, the film holders 10*a* and 10*b* comprise a first section 12 and a second section 14 pivotally attached at one end by a flexible hinge or tape 50, whereby said sections may be readily moved apart, as shown in FIG. 5, for insertion therebetween of a film unit 40. Where desired, a short portion 52 adjacent the hinge 50 may be outwardly recessed to provide a thicker space for receiving the trap area 54 of the film unit 40. Any excess processing composition is trapped in said trap area 54, and the provision of such a recess 52 effectively avoids undesired compression on the trap area 54 which might result in part of the excess processing composition being squeezed out or back into the image area. To facilitate rapid separation of the sections 12 and 14, one corner 12*a* may be rounded at a greater radius than the facing corner 14*a*. Where desired, suitable means (not shown) may be provided to limit the maximum angle to which the sections 12 and 14 may be separated, thereby aiding in the retention of warmer air therebetween. Similarly, suitable means (not shown) may be provided to provide a predetermined space between sections 12 and 14.

In the preferred methods of using the film holders of this invention, the film holder is prewarmed prior to insertion of the film unit. This prewarming may be conveniently accomplished by placing the film holder in a shirt pocket or coat pocket or in any other location where the film holder may receive body heat. In has been found, for example, that a film holder formed of sheet aluminum 0.025" thick which was initially at a temperature of 50° F. will reach a temperature of approximately 70° F. in from 1 to 1½ minutes in an inside pocket of a person wearing an overcoat. With longer prewarming times, the film holder may reach temperatures on the order of 75 to 80° F. under such conditions.

In the preferred embodiments, the film holders of this invention are formed of sheet aluminum at least 0.020", and preferably 0.025", thick. Although such thickness is desirable to provide rigidity for protecting the film unit during handling, it has been found that such thicknesses are necessary to provide proper and even distribution of heat to the film unit being processed. The inside surface of the film holder should be smooth to facilitate heat transfer, and the regular mill finish for sheet aluminum has been found to be satisfactory. Since the heat is transferred by conduction, care should be taken that any decorative trim or outer coating not interfere with the rate of heat transfer. In certain embodiments, the use of a plastic vinyl outer coating may be desirable since the plastic vinyl coating would act as an insulator and aid in the retention of heat within the film holder. Such plastic coatings thus would be more useful with a film holder of the type shown in FIGURE 1 than of the type shown in FIG. 5.

A particularly useful and preferred holder is slightly curved and formed of two 0.025" aluminum sheets 3½" wide by 5" long (before curving) and curved (as shown in FIG. 5) at a radius of 50". Curved film holders of this type are particularly adapted to be removably mounted within the protective cover of the camera, such as the camera cover shown in the copending application of Richard R. Wareham, Ser. No. 268,917, filed Mar. 29, 1963 (now U.S. Patent No. 3,165,043 issued Dec. 12, 1965).

As previously indicated, use of the film holder of this invention has facilitated the processing of film units at air temperatures, even as low as 25° F., and has materially contributed to markedly improved picture quality when imbibition is effected at low temperatures. In comparison tests, pairs of film units (for forming multicolor transfer images in accordance with the multilayer processes disclosed in U.S. Patent No. 2,983,606 issued May 9, 1961 to Howard G. Rogers) were similarly exposed at the same low temperature, one such film unit then being processed within the film clip in accordance with this invention and the other being processed in the normal manner. The multicolor images obtained when imbibition was completed as described above with a film holder of this invention have been of unexpectedly good quality, and characterized by substantially improved highlights (said highlights having materially less yellow coloration), by truer colors, particularly greens, and by better skin tones. In addition, the surface of the positive image has been found to be much smoother, with no salting out thereon as may occur at very low temperatures, and with clean separation of the positive image surface from the layer of viscous processing composition. The processing technique herein contemplated has the advantage that the processing composition has a higher viscosity at such low temperatures. This increased viscosity results in more even spreading of the viscous processing composition, and helps to reduce mottle in the transfer image.

In addition, it has been found that use of the film holders in accordance with this invention makes it possible to perform diffusion transfer processes in shorter imbibition times than if the film holders were not used. In one test performed in a cold room maintained at 45° F., the imbibition period necessary for a multicolor film unit processed without benefit of the film holders of this invention was 2 minutes, whereas a superior color image was obtained in 1½ minutes when the film unit was placed within the film holder within 15 seconds after removal from the camera, and the film holder promptly placed in a pocket under an overcoat. In another similar test wherein the film unit was placed within the film holder within 7 seconds after removal from the camera, it was found that excellent quality multicolor transfer images were obtained within the same 50 second imbibition period employed for normal processing at 75° F. Where the film unit is placed within a prewarmed film holder within 10 seconds after removal from the camera, it has generally been found that no change in exposure is necessary from that normally employed at room tempertaure processing.

Although the preferred embodiments of this invention contemplate placing the film holder in a pocket, many of the advantages may be obtained by holding the film holder between the user's hands. The even heat distribution and conduction imparted by the relatively thick sheets of aluminum make this latter technique practical.

The film units with which this invention are concerned generally have a thickness, in the image area, after the processing composition has been applied, of about 0.015 to 0.025 inch. Because of this fact, the efficient heat transfer of the aluminum sheets, and the intimate contact of the film holder with the film unit (especially those of FIGS. 4 and 5), only a surprisingly few calories of heat are needed in the novel processing technique of this invention.

Although the film holders of this invention are particularly useful in color diffusion transfer processes, they have been found to be useful also in silver transfer processes where processing is performed outside of the camera. Thus, it has been found that a 45 second imbibition period required to obtain a silver transfer image was shortened to about 15 seconds with improved image quality by use of the film holders an processing technique of this invention.

Since certain changes may be made in the above processes and products without departing from the scope of the invention herein involved, it is intended that all matter contained in the above description or shown in the accompanying drawings shall be interpreted as illustrative and not in a limiting sense.

What is claimed is:

1. The method of processing a diffusion transfer photographic film unit at relatively low temperatures comprising exposing a photosensitive element at an air temperature below about 60° F.; bringing said exposed photosensitive element into superposed relationship with an image-receiving element with a layer of viscous processing composition therebetween to thereby provide an exposed film unit; removing said exposed film unit from said camera; placing said exposed film unit in a film holder comprising a pair of heat-conductive sheetlike aluminum elements whereby said exposed film unit is held in heat-transfer relationship with said heat-conductive elements; and placing said film holder containing said exposed film unit in an area appreciably warmer than said air temperature whereby heat is transferred to said film unit, and completing the processing of said exposed film while said film holder is in said warmer area.

2. The method as defined in claim 1, wherein said film holder is placed in said warmer area prior to exposing said film unit, thereby prewarming said film holder.

3. The method as defined in claim 1, wherein said warmer area is within a person's apparel.

4. The method as defined in claim 1, wherein said air temperature is below about 45° F. and said warmer area is effective to rapidly warm a film unit postioned within said film holder to a temperature of at least about 65° F.

5. The method as defined in claim 1, wherein said exposed film unit is placed within said film holder within about 10 to 15 seconds after being removed from said camera, the normal processing time for said film unit at room temperature being about 50 to 60 seconds.

6. The method as defined in claim 5, wherein said film unit is exposed at the same exposure index as would be used if the film unit were exposed at room temperature.

References Cited

UNITED STATES PATENTS

| | | | |
|---|---|---|---|
| 487,959 | 12/1892 | McDonald. | |
| 1,236,654 | 8/1917 | Baltzley | 24—259 |
| 2,677,647 | 5/1954 | Lovell. | |
| 2,687,626 | 8/1954 | Bartlowe | 165—171 X |
| 2,768,564 | 10/1956 | Land | 96—29 |
| 2,852,691 | 9/1958 | Land | 96—76 X |
| 2,882,155 | 4/1959 | Erlichmann | 96—71 |
| 3,047,648 | 7/1962 | Mowatt | 165—80 |

NORMAN G. TORCHIN, *Primary Examiner.*

G. COHN, *Assistant Examiner.*

U.S. Cl. X.R.

95—89